United States Patent
Gutmann et al.

(10) Patent No.: US 6,244,413 B1
(45) Date of Patent: *Jun. 12, 2001

(54) GEARING TOOTH FORM

(75) Inventors: Peter Gutmann; Georg Tauschek; Gerd Weissmann, all of Munich (DE)

(73) Assignee: BLW Praezisionsschmiede GmbH, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,240
(22) PCT Filed: Feb. 12, 1998
(86) PCT No.: PCT/EP98/00777
 § 371 Date: Jan. 19, 1999
 § 102(e) Date: Jan. 19, 1999
(87) PCT Pub. No.: WO98/42995
 PCT Pub. Date: Oct. 1, 1998

(30) Foreign Application Priority Data

Mar. 21, 1997 (DE) .............................. 197 11 971

(51) Int. Cl.$^7$ .................................................. F16D 11/14
(52) U.S. Cl. ........................................ 192/108; 192/114 T
(58) Field of Search ................................ 192/114 T, 108, 192/69.82, 69.83, 69.7, 69.9

(56) References Cited

U.S. PATENT DOCUMENTS

| | | | |
|---|---|---|---|
| 2,049,127 | * 7/1936 | Maybach | 192/114 T X |
| 2,388,456 | * 11/1945 | Wildhaber | 192/69.82 |
| 2,718,176 | 9/1955 | King . | |
| 3,043,414 | * 7/1962 | Peras | 192/69.9 X |
| 3,779,352 | * 12/1973 | Worner | 192/108 X |
| 4,727,968 | * 3/1988 | Chana | 192/108 X |
| 4,905,806 | 3/1990 | Hillenbrand . | |
| 5,524,738 | 6/1996 | Eriebach . | |

FOREIGN PATENT DOCUMENTS

| | | | |
|---|---|---|---|
| 700712 | 12/1940 | (DE) . | |
| 738515 | 8/1943 | (DE) . | |
| 1130651 | 5/1962 | (DE) . | |
| 0195706 | 9/1986 | (EP) . | |
| 404567 | 1/1934 | (GB) . | |
| 1183751 | * 7/1985 | (SU) | 192/108 |
| 9421935 | 9/1994 | (WO) . | |

OTHER PUBLICATIONS

Soviet Inventions Illustrated, Section PQ, Week 8619 May 23, 1986, Derwent Publications Ltd., London, GB; Class Q63, AN 86–123601 XP002068606.

* cited by examiner

Primary Examiner—Charles A Marmor
Assistant Examiner—Ankur Parekh
(74) Attorney, Agent, or Firm—Helfgott & Karas, P.C.

(57) ABSTRACT

The invention concerns a morphology matrix for forming the cross-sectional shape of a short gearing tooth, in particular on toothed wheels of motor vehicle gearboxes. The short gearing teeth are formed on a cylindrical section of a gear wheel or gear shift sleeve, the axis of this section coinciding with the displacement axis of the gear shift sleeve. Each tooth comprises a tip which is chamfered in roof-like manner and has lateral flanks (3) which are shaped towards the tooth base (1) so that they have a relief at least over part of their height. The lateral flanks (3) terminate in a radiused tooth base (4), all of the teeth, or some thereof defined according to a regularly changing pattern, having at least a morphology defining the shape of the lateral flanks.

14 Claims, 1 Drawing Sheet

GEARING TOOTH FORM

Figure 1:
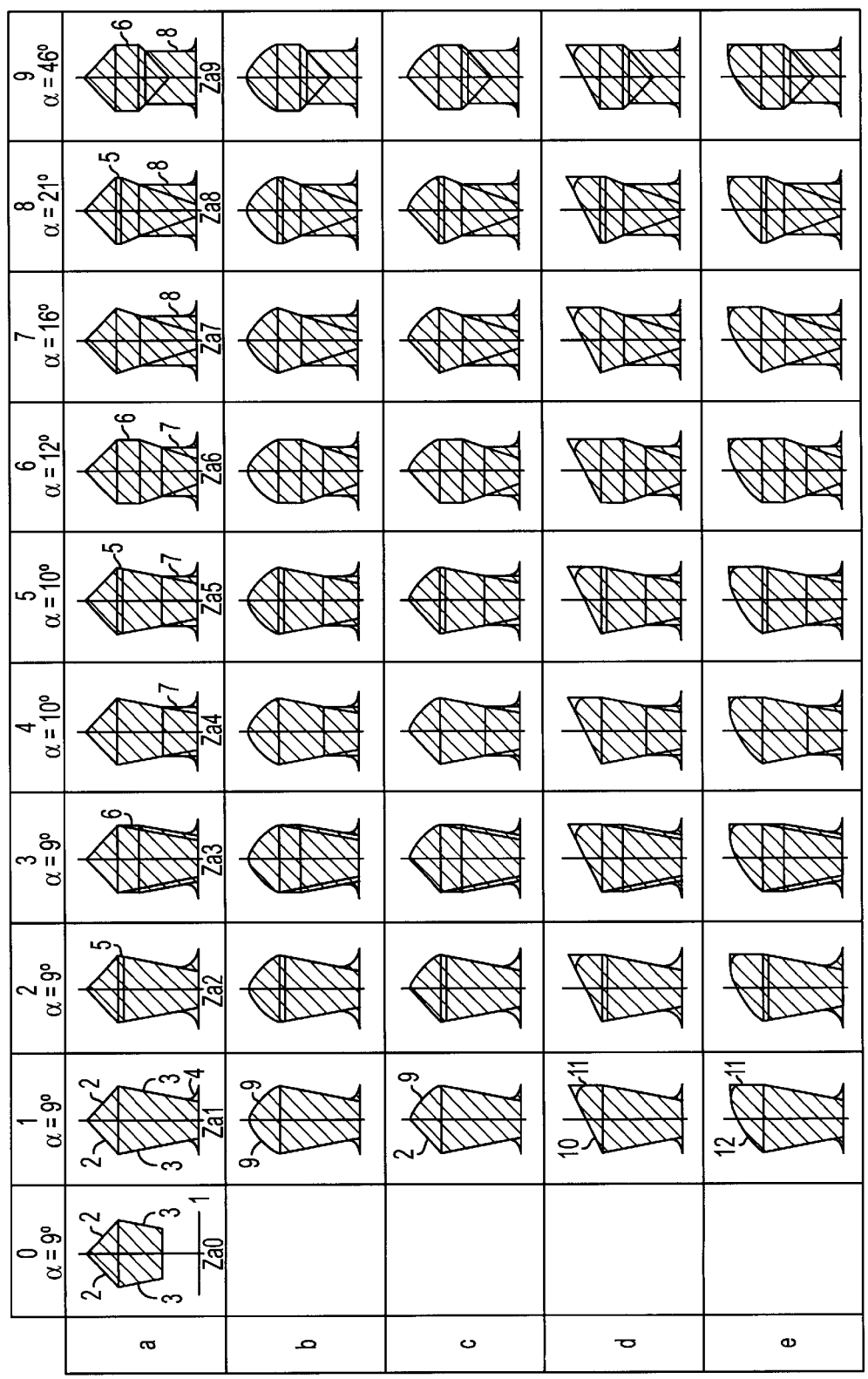

The invention concerns a morphology matrix for forming the cross-sectional shape of a short gearing tooth, in particular on toothed wheels of motor vehicle gearboxes, the short gearing teeth being formed on a cylindrical section of a gear wheel or gear wheel sleeve, the axis of this section coinciding with the displacement axis of the gear shift sleeve, each tooth comprising a tip which is chamfered in a roof-like manner and lateral flanks which terminate in a radiused tooth base and comprise an undercut section that extends at least over part of the flank height.

The above-mentioned short gearing morphology is described in the relevant technical literature and has been translated into practice.

An essential characteristic to be achieved in a short gearing system consists in the smoothest possible shifting between two gear wheels already moving synchronously, i.e. in limiting friction to an absolute minimum; especially reducing the occurrence and duration of frontal contact between the gear tips of two short gearing units. However, neither axial contact nor the safe axial stability of the selected gearshift mechanism may be sacrificed in favor of such shifting comfort. Instead, specially shaped lateral tooth flanks are used, the tooth flanks comprising an undercut section so that at least part of the lateral tooth flank tapers towards the tooth base. Two corresponding interacting short gearing units thus designed ensure that neighboring undercut lateral tooth flanks are appropriately protected against axial displacement and the resulting undesired undoing of the shifting connection.

The expert is familiar with the fact that individual teeth in a conventionally designed short gearing system are over their entire height attached to a cylindrical section and can also be attached to a base. Additionally, the expert is familiar with the fact that a radiused tooth base can improve the resistance of the teeth and that roof-like chamfering of the tooth tip can facilitate the meshing of the teeth.

However, as there are many different possibilities for application of short gearing systems which are characterised by different loads and load changing patterns and as different shifting comfort and shifting safety requirements must be met in practice, also requiring a number of criteria in connection with the metal forming method to be met, it can be assumed that the expert will usually find it difficult to identify the most appropriate solution for every single case.

In view thereof, one of the objectives of the present invention consists in providing an overview of the layout and design criteria for short gearing units, i.e. in offering the expert a means by which he can easily and reliably identify the solutions meeting the applicable requirements in every specific case.

The proposed invention is not limited to the identification of a single solution for each case but consists of a morphology matrix for the adequate designing of the cross-sectional shapes of short gearing teeth.

Additionally, the morphology matrix mentioned above is characterised by the fact that all teeth or a part thereof defined according to a regularly changing pattern are characterised by at least one of the two following features defining the design of the lateral tooth flanks:

a) Between the lower edge of the tooth roof surface of the tooth tip and the undercut section of the tooth flank an upper spur toothing section in the shape of a guiding surface (flat) largely parallel to the longitudinal axis of the tooth is provided, the guiding surface being either narrow or wide.

b) Between the undercut section of the tooth flank and the radiused tooth base a lower spur toothing section is provided in the form of a tooth base reinforcement with a supporting surface largely parallel to the longitudinal axis of the tooth, the supporting surface being either low or high.

The matrix which constitutes the object of the present invention is based on the assumption that said invention facilitates, in addition to the undercut flank section, depending on a specific application, one or two spur gear sections in particular, consisting of additional sections on each lateral flank, namely either an upper spur toothing section above the undercut section of the flank and/or a lower spur toothing section below the undercut section of the flank.

The upper spur toothing section constitutes a guiding surface, also called "flat", which becomes effective when the teeth begin to engage and reinforces, in the initial contact area, the most lateral sections of the flank, thus prolonging the service life of the toothing. The guiding surfaces reduce the so-called "backlash", i.e. the forces occurring as a response to the shifting movement are reduced without increasing the face clearance.

The guiding surfaces can be narrow or wide (seen in the longitudinal direction of the tooth). The guiding surface (5) of the first width, measured in the direction of the tooth height can measure less than one sixth of the remaining height of the tooth tip above. The guidance surface (6) of the second width measured in the direction of the tooth height, may be shorter than the overall tooth height, but longer than half of the remaining height of the tooth tip above. The choice between narrow and wide guiding surfaces has a significant impact on the size of the relief angle of undercut because a wide guiding surface implies a larger and, thus, more effective relief angle than a narrow guiding surface. At the same time, the width of the guiding surface must be considered a function of the load, i.e. of the occurring torques.

However, the teaching of the present invention is not limited to an upper spur toothing section only. Instead, a lower spur toothing section located below the undercut flank section can be provided in addition to or instead of the upper spur toothing section. The lower spur toothing section reinforces the tooth base, consisting of a supporting surface parallel to the longitudinal axis of the tooth which counteracts the tapering of the tooth caused by the undercut tooth section. This kind of supporting surface thus directly increases the strength of the entire tooth, especially of the portion near the tooth base.

In cases where particularly high torque loads occur those learned in the art will, within the limits of the morphology proposed in the framework of the invention, combine an upper and a lower spur toothing section in order to benefit from a combination of both guiding surfaces and supporting surfaces.

The supporting surface of each tooth flank can be either high or low. The choice between high or low will mainly depend on the relief angle chosen by the expert.

If only one upper spur toothing section—with a narrow or wide guiding surface—is intended, a relief angle of up to 9 angular degrees is recommended according to the correlation $0 \leq \alpha \leq 9$.

If a lower spur toothing section with a low supporting surface—with or without an additional upper spur toothing section—is provided, a relief angle between 3 and 12 angular degrees is recommended according to the correlation $3 \leq \alpha \leq 12$.

If a lower spur toothing section with a high supporting surface—with or without an upper spur toothing section—is intended, a relief angle between 6 and 60 angular degrees is recommended according to the correlation 6≦α≦60. The largest relief angles are realised by selecting an upper spur toothing section in the form of a wide guiding surface and a lower spur toothing section in the form of a high supporting surface.

Supporting surface (7) of the low type, measured from the tooth base can be wider than the guiding surface of the wide type but is lower than half the tooth height measured from the tooth base (1) to the lower edge of the roof surface. The supporting surface (8) of the high type, measured from the tooth base, is approximately half as long as the overall tooth height. These rules can be derived on the basis of the overall geometry and are only valid when teeth with an identical overall tooth height or tooth tip height, respectively, are compared. The tooth height measured from below the tooth tip to the tooth base is the sum total of the guiding surface, the undercut flank section and the supporting surface, whereas towards the bottom always follows a radiused tooth base which can be designed with a smaller radius on teeth with a supporting surface in comparison with teeth without a supporting surface.

As far as the shape of the roof-shaped tooth tip is concerned, it is assumed that the intended roof shapes consist of familiar shape elements, i.e. of straight or convex roof surfaces.

The straight roof surface stands out for its durability. On the other hand, it implies a large friction surface which means that the forces counteracting the tooth engaging process are relatively high.

The convex roof surface implies a reduced friction force due to the fact that contact is limited to a narrow line only, which means that a higher shifting comfort can be achieved.

In the case of reversible gears, i.e. gear wheels that can rotate in both directions, only symmetrical roof shapes can be used. For conventional non-reversible gear wheels asymmetrical roof shapes are particularly favourable which limit the period during which significant counterforces must be expected in the course of the engaging process. The duration of blocking, if any, during the engaging process decreases as the shape of the tooth tip approaches a monopitch roof.

The two roof surfaces of a tooth tip can either both be plane or convex or one can be plane and one convex. The ease of meshing achieved by convex roof surfaces can be increased in nonreversible gear wheels by manufacturing one of the roof surfaces as a plane surface that is largely parallel to the longitudinal axis to the tooth while the other roof surface is correspondingly pitched and forms a monopitch roof shape together with the first surface.

In the following the invention is explained by means of an illustration which shows an image matrix.

The matrix contains nine fully occupied vertical columns and five fully occupied horizontal rows. The columns are numbered 1–9, the rows are allocated the letters a–e. Thus every tooth shape indicated can be clearly identified.

Row a contains two state-of-the-art tooth shapes. Column 0 contains a tooth Za0 that does not extend all the way to base 1. It has a symmetrical roof shape with a plane roof surface 2 (roof shape D2, 2) and undercut lateral flanks 3 which end at a certain distance from the tooth base 1, which means that between the tooth Za0 and tooth base 1 a clearance exists for a tool used to machine the undercut lateral flanks, e.g. by offset shaping.

Tooth Za1 has the cross section of a short tooth gearing which is covered by the preamble of claim 1, thus, like tooth Za0, is included in the state of the art. A roof shape D2, 2 is combined with lateral flanks 3 which are undercut all the way down to the tooth base 1, ending at tooth base 1 with a radiused tooth base 4. In practice this kind of tooth has been manufactured by applying metal forming methods. All other teeth described in the matrix covered by the invention can also be manufactured by metal forming methods.

According to the systematics underlying the matrix, the tooth shapes are arranged within the rows in such a way that the relief angle increases from column 1 to column 9. This is due to the choice and/or combination of spur toothing sections. As the intention of the matrix protected under the present invention consists in identifying an appropriate choice and/or combination of spur toothing sections, the tooth shapes indicated in column 1, rows b to e are not covered by the protected object of the invention as they include no spur toothing sections at all.

These tooth shapes are nevertheless included in the matrix for systematic reasons so as to illustrate the different roof shapes by which the tooth shapes of the matrix differ from row to row.

Tooth shape Za2 differs from the state of the art according to Za1 by the fact that an upper spur toothing section in the form of a narrow guiding surface 5 is intended. In contrast to this, tooth shape Za3 is provided with a wide guiding surface 6.

Tooth shape Za4 differs from the tooth shapes indicated above by the fact that it comprises a lower spur toothing section in the shape of a low supporting surface 7.

Tooth shape Za5 comprises both an upper and a lower spur toothing section in the form of a narrow guiding surface 5 and a low supporting surface 7.

Tooth shape Za6 is characterised by a combination of a wide guiding surface 6 and a low supporting surface 7.

Tooth shape Za7 has only a lower spur toothing section manufactured in the form of a high supporting surface 8.

Tooth shape Za8 is characterised by a combination of a high supporting surface 8 and a narrow guiding surface 5.

Tooth shape Za9 is characterised by a combination of a wide guiding surface 6 and a high supporting surface 8.

The relief angle α is for each tooth shape of row a indicated above the roof shape in the respective illustration. All angles indicated merely serve as examples for possible angles. Identical angles are indicated for all tooth shapes in rows b to e as the widths and lengths in these rows are identical. As indicated above, the rows only differ by the various roof shapes. Therefore, the individual tooth shapes need not be described for every single row.

The roof shape illustrated in row b is spherical, i.e. the tip consists of two convex roof surfaces 9 which, combined into a roof tip like all other specified roof shapes, yield a rounded tip. The roof shapes D2, 2 in row a and D9, 9 in row b are symmetrical; they are suitable for gear wheels that will actually or can be rotated in both directions. In contrast to roof shape D2,2, roof shape D9,9 is characterised by the fact that the contact with an interlocking toothed unit is limited to a line, thus facilitating the meshing of the teeth in comparison with roof shape D2,2.

Rows c, d and e illustrate asymmetrical roof shapes. Row c contains roof shape D2, 9 in which the engaging of the teeth on the side of the convex roof surface 9 is facilitated. If the interlocking gear wheel is manufactured inversely, the manufacturing process is facilitated by the fact that both gear wheels can be manufactured with one plane roof surface which can be manufactured more easily.

Row d contains a roof shape that resembles a monopitch roof, the inclined roof surface being manufactured as plane roof surface 10. The second roof surface 11 is parallel to the longitudinal tooth axis. Similarly, row e also contains a monopitch roof, the inclined roof surface 12 however being convex. This type of asymmetrical monopitch roof shapes can only be used for gear wheels, which rotate in only one direction. The advantage of the monopitch roof shape consists in the fact that the probability of frontal contact during the meshing is significantly reduced as the engaging of the teeth can only be blocked within a small marginal section of the monopitch roof shape.

As a matter of course, the asymmetrical roof shapes illustrated in rows c to e can also be mirror-inverted in relation to the longitudinal tooth axis. The matrix can, within the framework of the current invention, be even extended by selecting other roof shapes or by varying the geometrical properties as far as the tooth height is concerned.

What is claimed is:

1. A short gearing tooth, for use in particular on toothed wheels of motor vehicle gearboxes, said gearing tooth comprising:
   a tooth height defined between a tooth base and a tooth tip as viewed along the longitudinal axis of the tooth,
   said tip being chamfered to form a roof surface having a lower surface,
   lateral flanks, which are undercut over at least part of their height measured along the longitudinal axis of the tooth, tapering towards the tooth base thereby forming a relief angle ending in a radiused tooth base,
   a guiding surface having an upper terminus and a lower terminus and a width defined therebetween as measured along the longitudinal axis of the tooth, said guiding surface being formed on said lateral flanks between the lower edge of the roof surface and the undercut section of the lateral flanks and being largely parallel to the longitudinal axis of the tooth, said guiding surface width being smaller than the distance along the longitudinal axis of the tooth from the upper terminus of the guiding surface to the tooth tip, and
   a supporting surface having a lower terminus and an upper terminus and a width formed therebetween, said supporting surface being formed between the undercut section of the lateral flanks and the radiused tooth base and largely parallel to the longitudinal axis of the tooth.

2. A short gearing tooth according to claim 1, wherein said relief angle amounts to up to 9 angular degrees.

3. A short gearing tooth according to claim 1, wherein said relief angle is between 3 and 12 angular degrees.

4. A short gearing tooth according to claim 1, wherein said relief angle is between 6 and 60 angular degrees.

5. A short gearing tooth according to claim 1, wherein the width of the guiding surface measures less than one-sixth of the distance along the longitudinal axis of the tooth from the upper terminus of the guiding surface to the tooth tip.

6. A short gearing tooth according to claim 1, wherein the width of the guiding surface is less than the tooth height but greater than half of the distance along the longitudinal axis of the tooth from the upper terminus of the guiding surface to the tooth tip.

7. A short gearing tooth according to claim 1, wherein the width of the supporting surface is larger than the width of the guiding surface and smaller than the distance along the longitudinal axis of the tooth from the tooth base to the lower surface of the roof surface (or alternatively "to the upper terminus of the guiding surface").

8. A short gearing tooth according to claim 1, wherein the width of the supporting surface is approximately half as long as the tooth height.

9. A short gearing tooth according to claim 1, wherein the tooth tip is designed either symmetrical or asymmetrical.

10. A short gearing tooth according to claim 9, wherein the tooth tip consists of two roof surfaces of which both can be manufactured either as a plane surface or as a convex surface or of which one can be designed as a plane and the other as a convex surface.

11. A short gearing tooth according to claim 10, wherein one of the roof surfaces is manufactured as a plane surface largely parallel to the longitudinal axis of the tooth while the other roof surface is approximately inclined, forming a roof shape resembling a monopitch roof together with the first roof surface.

12. A short gearing tooth, comprising:
   a tooth height defined between a tooth base and a tooth tip as viewed along the longitudinal axis of said tooth, said tooth tip being chamfered to form a roof having a lower surface,
   lateral flanks, which are undercut over at least part of their height measured along the longitudinal axis of the tooth, extending from the lower surface of the tooth tip roof and tapering towards the tooth base forming a relief angle ending in a radius that terminates at the tooth base,
   a guiding surface having an upper terminus and a lower terminus and a width defined therebetween as measured along the longitudinal axis of the tooth, said guiding surface width being further defined as narrow or wide, said guiding surface being formed on said lateral flanks between the lower edge of the roof surface and the undercut section of the lateral flanks and being largely parallel to the longitudinal axis of the tooth, said guiding surface width being smaller than the distance along the longitudinal axis of the tooth from the upper terminus of the guiding surface to the tooth tip, and
   supporting surface having a lower terminus and an upper terminus and a width formed therebetween, said supporting surface being formed between the undercut section of the lateral flanks and the tooth base and largely parallel to the longitudinal axis of the tooth,
   wherein said narrow guiding surface width is less than one-sixth of the distance along the longitudinal axis of the tooth from the upper terminus of the guiding surface to the tooth tip, and
   wherein said wide guiding surface width is less than the tooth height and greater than one-half of the distance along the longitudinal axis of the tooth from the upper terminus of the guiding surface to the tooth tip.

13. A short gearing tooth, comprising:
   a tooth height defined between a tooth base and a tooth tip as viewed along the longitudinal axis of said tooth, said tooth tip being chamfered to form a roof having a lower surface,
   lateral flanks, which are undercut over at least part of their height measured along the longitudinal axis of the tooth, extending from the lower surface of the tooth tip roof and tapering towards the tooth base forming a relief angle ending in a radius that terminates at the tooth base,
   a guiding surface having an upper terminus and a lower terminus and a width defined therebetween as measured along the longitudinal axis of the tooth, said guiding surface being formed on said lateral flanks between the lower edge of the roof surface and the undercut section of the lateral flanks and being largely parallel to the longitudinal axis of the tooth, said guiding surface width being smaller than the distance along the longitudinal axis of the tooth from the upper terminus of the guiding surface to the tooth tip, and a supporting surface having a lower terminus and an upper terminus and a width formed therebetween, said supporting surface width being further defined as low or high, said supporting surface being formed between the undercut section of the lateral flanks and the tooth base and largely parallel to the longitudinal axis of the tooth, wherein said low supporting surface width is greater than the width of the guiding surface and less than less than the distance along the longitudinal axis of the tooth from the tooth base to the lower surface of the roof, and wherein said high supporting surface width is approximately one-half the tooth height.

14. A short gearing tooth, comprising:

a tooth height defined between a tooth base and a tooth tip as viewed along the longitudinal axis of said tooth, said tooth tip being chamfered to form a roof having a lower surface, lateral flanks, which are undercut over at least part of their height measured along the longitudinal axis of the tooth, extending from the lower surface of the tooth tip roof and tapering towards the tooth base forming a relief angle ending in a radius that terminates at the tooth base, a guiding surface having an upper terminus and a lower terminus and a width defined therebetween as measured along the longitudinal axis of the tooth, said guiding surface width being further defined as narrow or wide, said guiding surface being formed on said lateral flanks between the lower edge of the roof surface and the undercut section of the lateral flanks and being largely parallel to the longitudinal axis of the tooth, said guiding surface width being smaller than the distance along the longitudinal axis of the tooth from the upper terminus of the guiding surface to the tooth tip, and a supporting surface having a lower terminus and an upper terminus and a width formed therebetween, said supporting surface width being further defined as low or high, said supporting surface being formed between the undercut section of the lateral flanks and the tooth base and largely parallel to the longitudinal axis of the tooth, wherein said narrow guiding surface width is less than one-sixth of the distance along the longitudinal axis of the tooth from the upper terminus of the guiding surface to the tooth tip, and wherein said wide guiding surface width is less than the tooth height and greater than one-half of the distance along the longitudinal axis of the tooth from the upper terminus of the guiding surface to the tooth tip, and wherein said low supporting surface width is greater than the width of the guiding surface and less than less than the distance along the longitudinal axis of the tooth from the tooth base to the lower surface of the roof, and wherein said high supporting surface width is approximately one-half the tooth height.

* * * * *